March 14, 1939.                    R. CHILTON                    2,150,541
                                  ROTARY VALVE
                            Filed Dec. 30, 1937              4 Sheets-Sheet 1
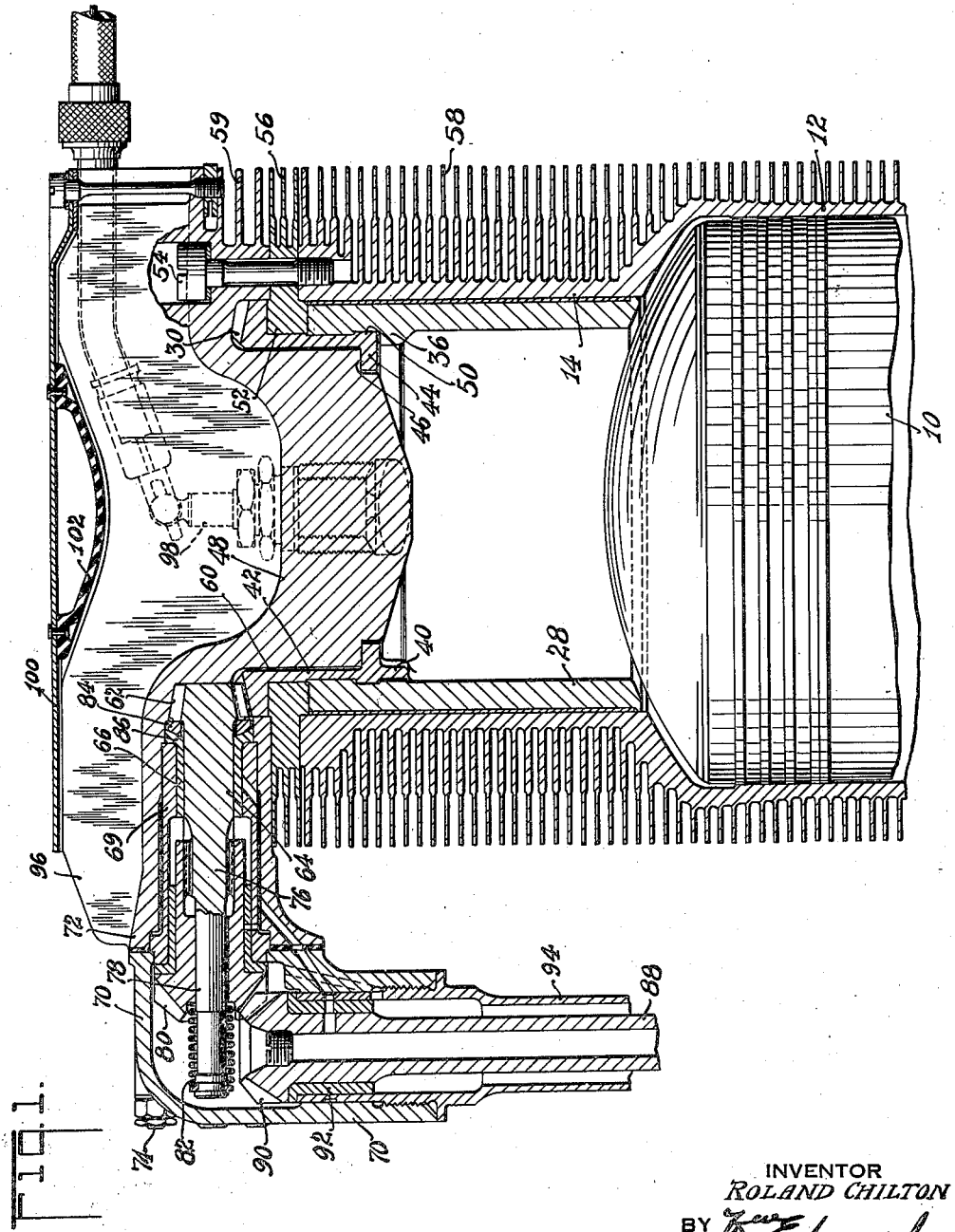
INVENTOR
ROLAND CHILTON
BY
ATTORNEY

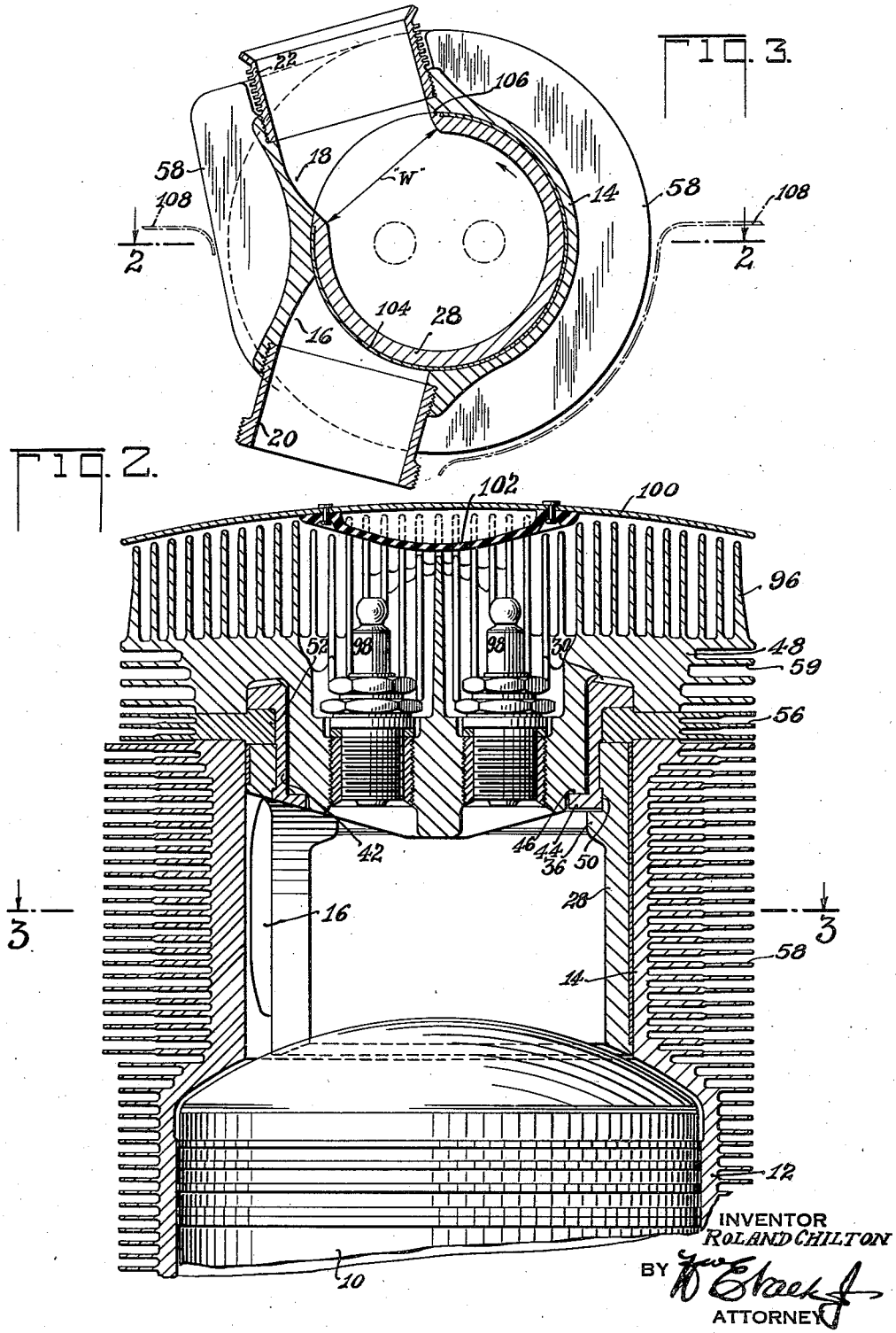

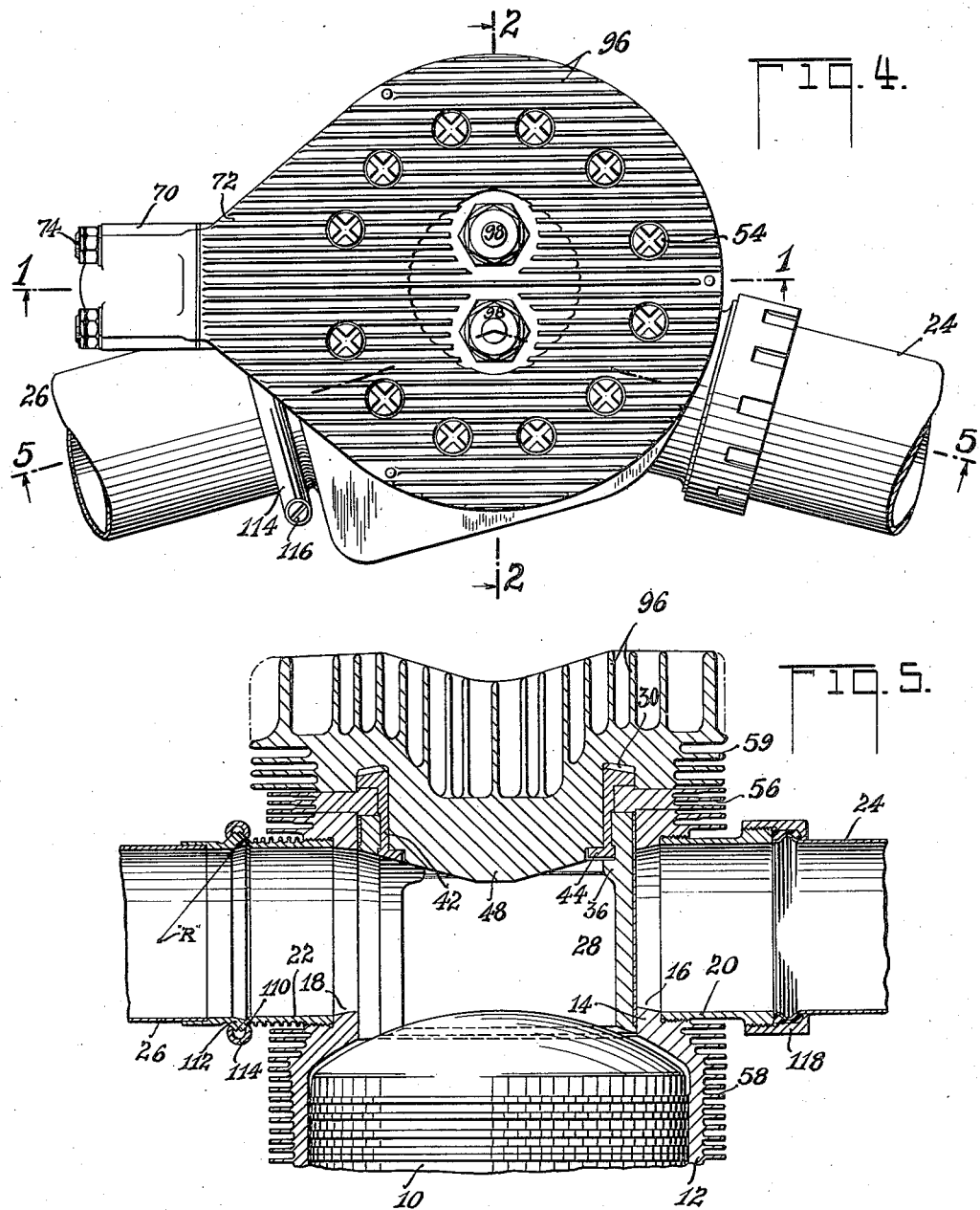

March 14, 1939.　　　　R. CHILTON　　　　2,150,541
ROTARY VALVE
Filed Dec. 30, 1937　　　　4 Sheets-Sheet 4
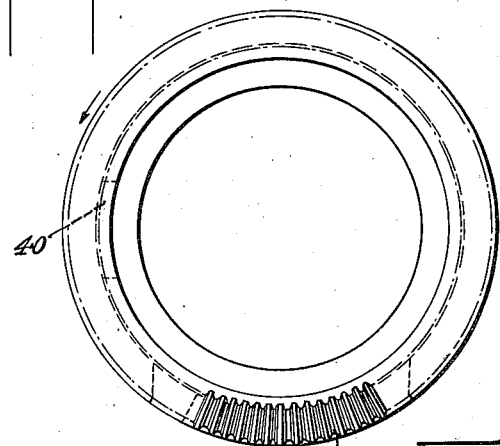
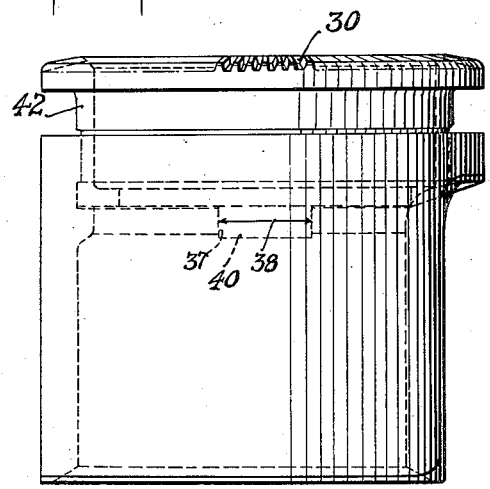 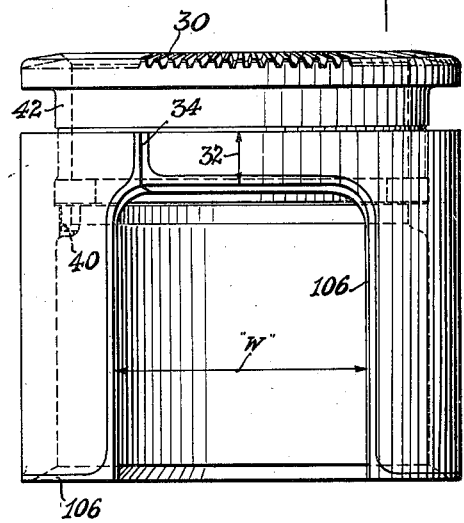
INVENTOR
ROLAND CHILTON
BY
ATTORNEY Patented Mar. 14, 1939

2,150,541

UNITED STATES PATENT OFFICE 2,150,541

ROTARY VALVE

Roland Chilton, Ridgewood, N. J., assignor, by mesne assignments, to Wright Aeronautical Corporation, Paterson, N. J., a corporation of New York Application December 30, 1937, Serial No. 182,456

10 Claims. (Cl. 123—190)

This invention relates to rotary valves, particularly for internal combustion engines and in certain respects, comprises improvements on my copending application, Serial No. 119,727. The objects and advantages of the invention will be obvious from, or will be pointed out, in the following description with reference to the drawings in which:

Fig. 1 is an axial section on the line 1—1 of Fig. 4 through the top of a cylinder incorporating the invention;

Fig. 2 is an axial section on the line 2—2 of Fig. 4;

Fig. 3 is a transverse section (on reduced scale) on the line 3—3 of Fig. 2;

Fig. 4 is a plan view;

Fig. 5 is a section through ports on the line 5—5 of Fig. 4, and

Figs. 6, 7 and 8 are detail views of the valve and driving gear unit.

Referring first to Fig. 1, 10 designates a conventional piston, operating in a cylinder barrel 12 equipped with a cylindrical extension or a combustion chamber 14 of reduced diameter provided with inlet and exhaust port openings 16—18 in which are screwed connection sleeves 20—22 for inlet and exhaust pipes indicated at 24—26, Figs. 4 and 5.

Rotationally fitted in the cylindrical extension 14 is a split cuff valve indicated in general by 28 and shown in detail, together with a bevel gear 30, in Figs. 6, 7 and 8. The valve is equipped with an opening or port of width W, Figs. 7 and 3, suitably related to the widths and positions of the inlet and exhaust ports 16—18 to produce the desired timing when the valve is rotated (at half speed in the case of a four-stroke engine).

It will be seen in Fig. 5 that the height of the valve is such that it overlaps the top and bottom of the ports 16—18 and that the valve port opening W is cut through at the bottom of the valve, but not at the top, where an element of width 32 (Fig. 7) extends over the top of the valve opening and in this element there is formed a slot 34. The valve is made slightly oversize with respect to its cylinder seat 14, and the slot 34 is arranged to be virtually closed when the valve is sprung into position in the cylinder. The valve towards its upper end is provided with an internal projecting annulus 36 in which there is formed a rectangular axial slot 37, the width of which is indicated at 38, Fig. 8, and this slot is engaged by a key 40 integral with a sleeve 42 which is, in turn, integral with the bevel gear 30.

The gear sleeve 42 at its bottom end is equipped with an in-turned flange 44 engaging an annular face 46 formed on a cylinder head 48 to comprise a seal under the axial pressure imposed on the sleeve 42, due to cylinder pressures. At its lower end, the gear sleeve 42 is also provided with a slight external shoulder 50 which engages a corresponding shallow recess turned in the inside of the valve. The valve, being split, is capable of being sprung over the projection 50 so that the valve and gear are relatively located axially while the integral key 40 forms the rotary driving connection therebetween.

Prior to this assembly, there is introduced between the upper end of the valve 28 and the lower face of the bevel gear 30 a bearing ring or plate 52, which ring is interposed between the upper end of the cylinder extension 14 and the head 48, the parts being clamped to form a gas tight joint by bolts 54.

It will now be seen that ring 52 comprises a thrust bearing, locating the bevel gear 30 from downward displacement, and the valve 28 from upward displacement and that this ring 52 is further provided with integral cooling fins 56, substantially co-extensive radially, with cooling fins 58 formed on the cylinder itself in the usual way, and fins 59 formed on the periphery of the head 48. The gear sleeve 42 is a running fit in the bore of the bearing plate 52 which, accordingly, provides also for the radial location of the bevel gear 30 which has a radial clearance, shown exaggerated at 60, with respect to the head 48 to allow for the expansion of the latter under running conditions. It will be seen that the integral fins 56 provide for direct cooling of the valve and gear locating bearings of the ring 52 and certain objects and advantages of the present invention reside in this structure.

Meshed with the bevel gear 30 is a small bevel pinion 62 having an integral shank 64 engaged in a bushing 66 in a detachable liner 69 clamped in position by a bevel gear housing 70 which is secured to an extension 72 of the cylinder head by studs 74. The bevel pinion shank 64 has a splined extension 76 and a further cylindrical extension 78 on which an outer bevel pinion 80 is free to float axially under the influence of the spring 82 by which the bevel gear 62 is urged to the left to cause a spherical sealing washer 84 to make sealing contact with a spherical seated flange 86 on the bushing 66.

A vertical drive shaft 88 has a bevel gear 90 formed integral at its upper end to mesh with the bevel gear 80, the shaft being supported in a suitable bushing 92 fitted in the housing 70. A fitting 94 extends downwardly from the housing 70 forming the upper part of a suitable closure around the shaft 88, these parts extending down to the crankcase of the engine (not shown). The combustion space is provided with a running seal between the head 48 and the flange 44, at 46 is provided with a labyrinth seal, which may carbon up without causing trouble between the sleeve 42, and the valve 28 and by the bevel gear seal at 84—86. The small clearances between the valve and gear sleeve and between the gear sleeve and ring provide a labyrinth whereby the pressure in the chamber occupied by the gear and pinion teeth, sealed at 84—86, may become substantially the mean pressure between maximum and minimum pressures in the combustion space, while the running seal at 46 prevents carbon entering into the space 60 between the head and sleeve 42, since these parts must have substantial clearance for expansion and contraction. Accordingly the annular groove in the head 28 occupied by the gear 30 operates under a relatively constant low pressure, and is effectively sealed from leakage by the seal 84—86.

The cylinder head has transverse fins 96 and is equipped with a pair of spark plugs 98 and with an air jacketing cover 100 to which is secured a small depending baffle 102, proportioned so that the air flow area between this baffle and the plugs through the depressed portion of the head is proportional to the flow areas at the entering and exit portions of the finning.

Referring now to the cross section of the valve 28 in Fig. 3, it will be seen that the working surface is covered with a facing 104, the valve surface being recessed so as to leave lands 106 which prevent the edges of the valve facing material from being exposed. This valve facing material is composed of powdered material sintered onto the body of the valve and subsequently finished therewith. The advantages of such material (on account of its porosity which enables it to retain lubricant) is known in the case of clutch plates where it has recently gone into extended use with beneficial results, and the application of this material in this non-analogous environment to comprise a composite valve is included in the objects and advantages of this invention, in combination with the protection of the edges of the sintered material which has given trouble with chipping in the case of clutches, and would be particularly subject to erosion by the exhaust gases in this embodiment.

A further advantage of this design resides in the simplified geometry developed in the port disposition which permits highly efficient finning to be machined with the minimum of operations. Referring to Fig. 3, it will be seen that by means of the screwed in sleeves 20—22, the stud bosses of the conventional flange and bolt connections are eliminated whereby all of the fins are opened to an un-interrupted airflow and whereby further, the fins themselves may be produced by profiling with gangs of milling cutters. A further advantage of the specific design resides in the simplicity of the baffles needed to confine the airflow to the finned periphery, according to the requirements of current practice. These are indicated in dot and dash lines at 108, it being understood that they will extend to the next adjacent cylinder of a radial engine.

The specific gearing by which the vertical drive shafts 88 are driven from the engine crankshaft form no part of this invention, and, accordingly, need not be shown.

Reference is now made to the section of Fig. 5 which illustrates an improved self aligning pipe connection used in conjunction with the screwed-in port sleeves 20—22 and here shown in conjunction with the exhaust port sleeve 22. The sleeve 22 has an angular flange 110, the inner and outer surfaces of which are both formed radii having a common center R. The exhaust pipe 26 has a bead 112, one surface of which engages the inner spherical surface of the flange 110, the other side of the bead being angled in the opposite direction to cooperate with a split clamp ring 114 contacting the bead 112 and the flange 110 by which the parts are drawn together by means of screws 116, Fig. 4. The bead member 112 is preferably secured to the exhaust pipe 26 by welding. This structure provides a quick detachable connection which offers a minimum of obstruction to the airflow into the fins, and comprises, in a sense, a ball and socket connection, wherein the tube 26 may angulate slightly with respect to the sleeve 22 while still maintaining a tightly sealed joint and full contact of the flange, bead and ring.

In the case of the inlet pipe, a conventional screwed gland and packing connection 118 is used. Such connections have been found unsatisfactory for the hot exhaust pipes which are subject to rapid corrosion, by which such large threads are apt to become "frozen" and cannot be disassembled without destroying the parts.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine cylinder, a cylindrical extension defining a combustion chamber, a cylinder head, cooling fins extending from said extension and head, a bearing plate clamped between said cylinder and head and having cooling fins extending therefrom and a rotary valve engaged in said extension and bearing against said plate.

2. In combination, a rotary valve, a cylinder member within which said valve is seated, a cylinder head member, and a valve bearing member interposed between the first two said members, all three said members having cooling fins extending therefrom.

3. The combination with a cylinder and a cylinder head having fins, of a bearing plate interposed therebetween also having fins, and a valve member rotationally engaging said cylinder and said plate.

4. A rotary valve for an engine cylinder comprising in combination, a sleeve having a port opening formed therein and a slit between an end of said sleeve and said opening whereby the sleeve is elastically expansible, a driving gear including a sleeve engaging the inner circumference of said valve, said sleeve and valve having a mating projection and groove over which the valve may be elastically sprung whereby the parts are retained in assembled relationship.

5. A rotary valve including a sleeve having a port opening and a slit between an end of said valve and said opening whereby the valve is rendered elastically expansible, a gear having a sleeve engaging the inner circumference of said valve, a key slot in said valve and a key integral with said sleeve and engaging said slot to drive the valve rotationally, and a projection in the other over which the valve may be sprung for assembly in virtue of said elasticity.

6. In combination, a cylinder, a cylinder head having a projection defining an annulus within the upper portion of said cylinder, a gear having a sleeve and a rotary valve engaging said sleeve in said annulus and means to seal said annulus comprising a flange on said sleeve engaging a seat formed on said head projection.

7. The combination with a rotary valve of a gear having a sleeve engaged in said valve, a bearing plate interposed between said sleeve and valve to axially locate the same, a cylinder in which said valve is rotationally engaged, and a head closing said cylinder, said bearing plate being clamped between said head and cylinder.

8. A cylinder head having a cylindrical extension and an annular recess, a gear in said recess having a sleeve embracing said extension, a flange in-turned from said sleeve and a face formed on said extension with which said flange engages for the purpose of sealing said annulus.

9. A rotary valve for an internal combustion engine including a valve cylinder, a cuff valve within the cylinder, an annular plate atop the cylinder with which the top of the cuff valve is in running engagement, a cylinder head including an annular groove mounted atop said plate, a bevel gear in said annular groove having a depending sleeve within and drivably engaging said valve and forming therewith a labyrinth seal between the combustion space and said annular groove, a bevel pinion journalled in the head driving said gear, and a second seal between said bevel pinion and said head.

10. In a rotary valve for an internal combustion engine, a valve cylinder, a cuff valve therein, a cylinder head having an annular groove, driving means for said valve within said groove, primary sealing means between said valve and cylinder head, means passing through said head in driving engagement with said driving means, and secondary means sealing said annular groove with respect to the means which passes through the cylinder head.

ROLAND CHILTON.